No. 611,152. Patented Sept. 20, 1898.
W. SHEDLOCK.
SALT PAN.
(Application filed Dec. 15, 1897.)

(No Model.) 3 Sheets—Sheet 1.

No. 611,152. Patented Sept. 20, 1898.
W. SHEDLOCK.
SALT PAN.
(Application filed Dec. 15, 1897.)
(No Model.) 3 Sheets—Sheet 2.

Witnesses
F. B. Keefer
V. Coombs

Inventor
William Shedlock
By James L. Norris
Atty

No. 611,152. Patented Sept. 20, 1898.
W. SHEDLOCK.
SALT PAN.
(Application filed Dec. 15, 1897.)
(No Model.) 3 Sheets—Sheet 3.
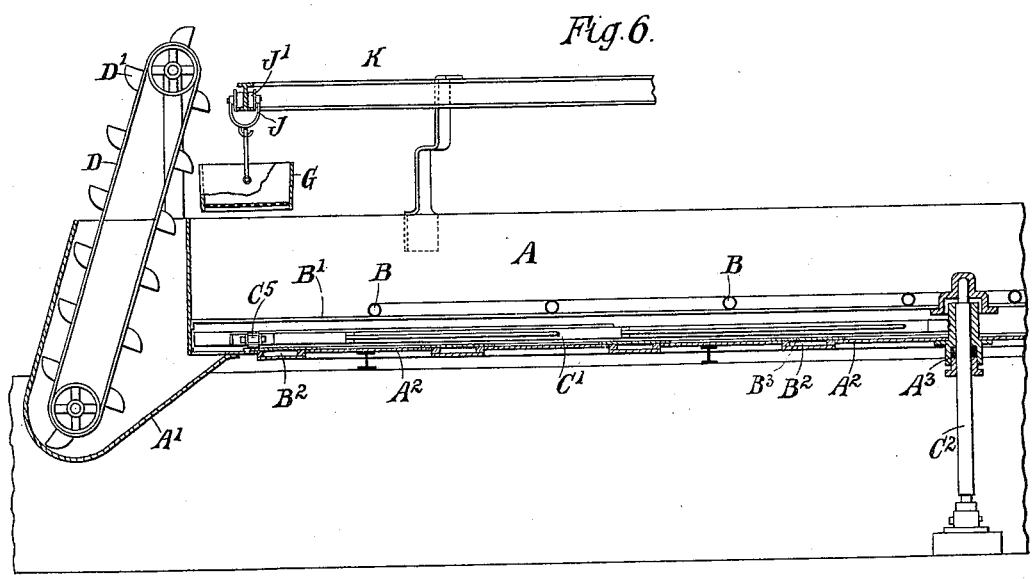
Fig. 6.
Fig. 7.
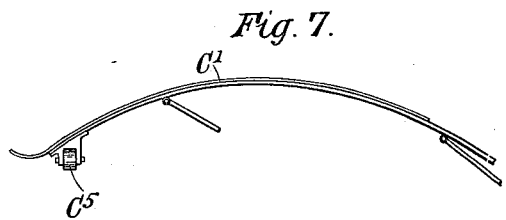
Witnesses
Inventor
William Shedlock
By James L. Norris
Atty

UNITED STATES PATENT OFFICE.

WILLIAM SHEDLOCK, OF LONDON, ENGLAND.

SALT-PAN.

SPECIFICATION forming part of Letters Patent No. 611,152, dated September 20, 1898.

Application filed December 15, 1897. Serial No. 662,035. (No model.) Patented in England April 13, 1896, No. 7,796, and May 5, 1897, No. 11,240.

*To all whom it may concern:*

Be it known that I, WILLIAM SHEDLOCK, engineer, a citizen of the United States of America, residing at London, England, have invented certain new and useful Improvements in Apparatus for Obtaining Salt from Brine and for Similar Purposes, (for which I have obtained British Patents No. 7,796, dated April 13, 1896, and No. 11,240, dated May 5, 1897,) of which the following is a specification, reference being had to the accompanying drawings, in which—

Figure 1:
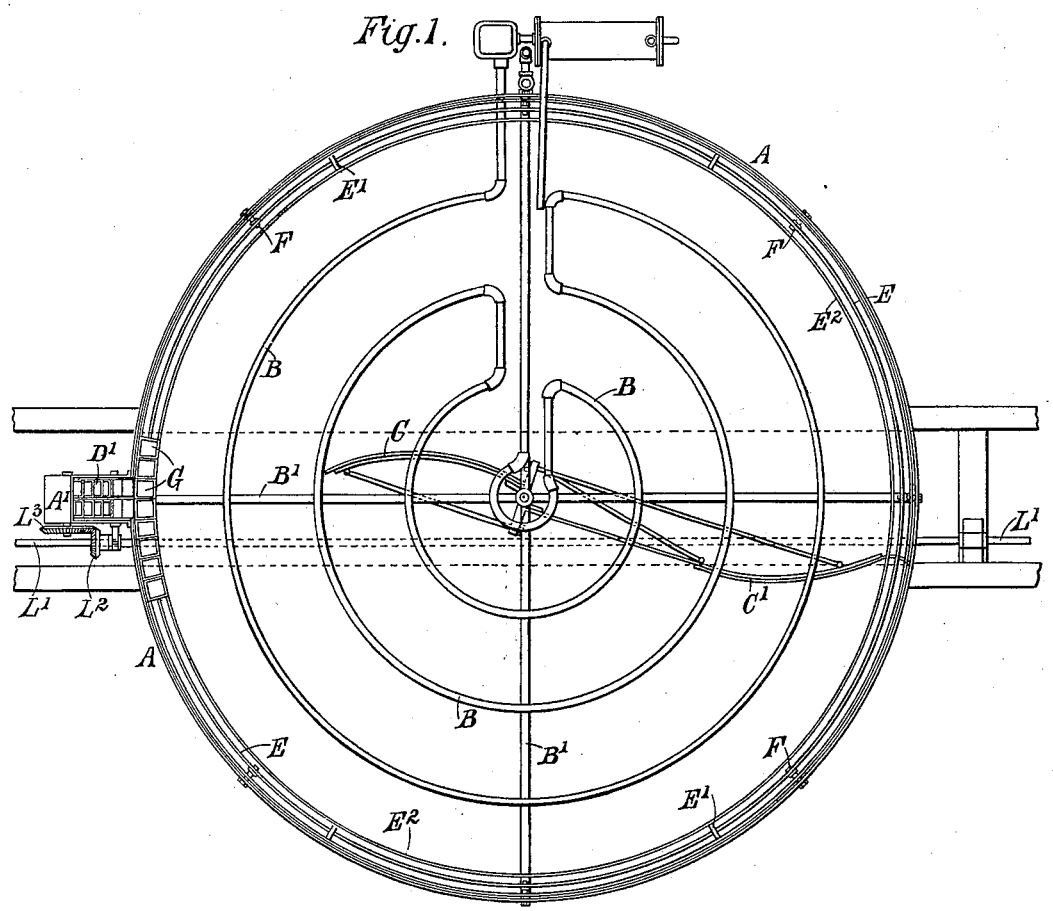
Figure 2:
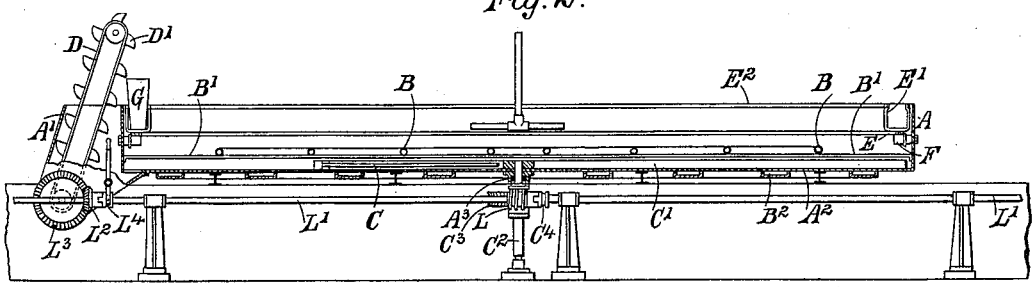
Figure 4:
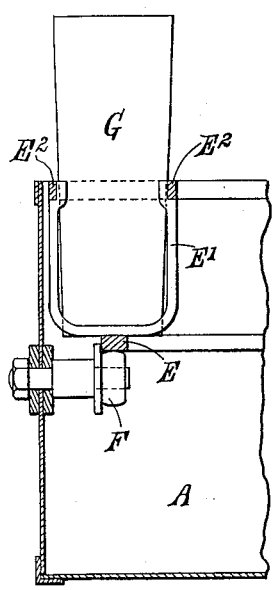
Figure 3:
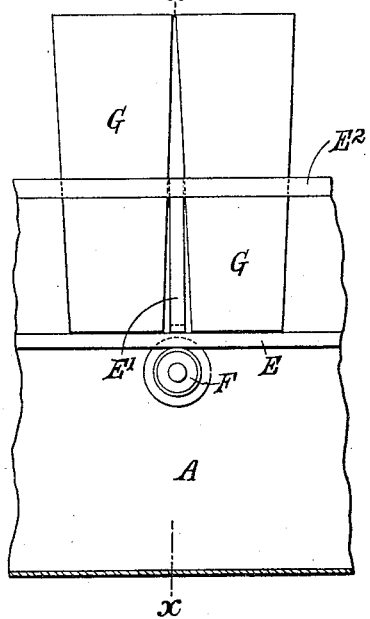
Figure 5:
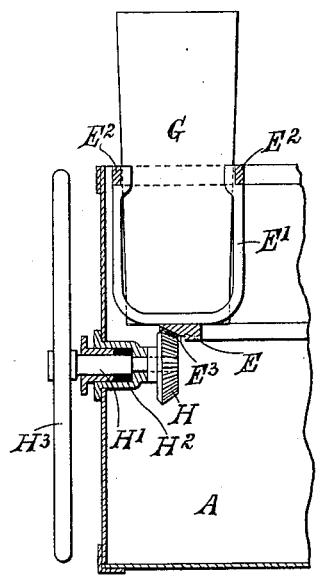

Figure 1 is a plan, and Fig. 2 a vertical central section, showing one form of my improved apparatus. Fig. 3 is a sectional elevation, and Fig. 4 a section on the line $x\,x$, Fig. 3, both drawn to an enlarged scale, illustrating details of construction. Fig. 5 is a vertical section, also drawn to an enlarged scale, showing means for rotating the mold-carrier. Fig. 6 is a partial vertical central section illustrating another form or modification of my improved apparatus. Fig. 7 is a plan illustrating a detail of construction.

My invention relates to apparatus for obtaining salt from brine and for similar purposes, and is chiefly designed to afford means whereby the evaporation of the liquid and the removal and collection of the crystals will be performed in a more efficacious and economical manner than heretofore.

My said invention comprises an apparatus of this kind or class in which molds, boxes, or cages for receiving the deposited crystals removed from the evaporating-pan are supported over the liquid in said pan in such a manner that the liquid which drains from the said molds, boxes, or cages or any crystals that may fall therefrom will be returned into the evaporating vessel or pan, and the empty molds can be easily and rapidly brought into position for receiving the salt from the elevator and the filled and drained molds removed.

My said invention also comprises the combination, with the evaporating-pan, of molds, boxes, or cages supported over the liquid in the said pan and elevating mechanism whereby the deposited crystals as they are removed from the said pan are automatically and continuously elevated and delivered into the said molds, boxes, or cages as the latter are successively brought into the filling position.

My said invention also comprises the combination, with the evaporating-pan, of a carrier arranged over the liquid in said pan and adapted to support molds, boxes, or cages for receiving the crystals, an external well connected with said pan, scrapers in said pan for continuously removing the deposited crystals from said pan into said external well, and means for raising said crystals from said well and delivering them into said molds, boxes, or cages successively; and my said invention also comprises a circular frame or carrier supported over the liquid in said pan so that it can easily be intermittently rotated, which carrier is adapted to receive the molds, boxes, or cages into which the deposited crystals are to be delivered; and my said invention further comprises other combinations hereinafter described, and pointed out in the claims.

Referring to Figs. 1 to 5 of the drawings, A is the evaporating vessel or pan for containing the brine or other liquid to be treated. B is a steam-coil whereby heat is applied to the said brine. I also provide a series of steam-chambers $B^2$ beneath the bottom $A^2$ of the pan A for heating the liquid. The coil B is supported on bars $B'$, secured to the wall of the pan A, so as to leave a space beneath the same in which are arranged revolving scrapers $C\,C'$, whereby the deposited crystals are removed from the bottom of the pan A into an external well $A'$, in which works an elevator D.

The upper walls $B^3$ of the flat heating-chambers $B^2$ are preferably made of rings or annular pieces of copper or other metal which is a good conductor of heat, as indicated in Fig. 6, so as to facilitate the conduction of heat to the brine or other liquid in the pan. These rings $B^3$ are riveted or otherwise secured to iron or steel rings $A^2$, so as to form therewith the bottom of the pan.

Within the evaporating vessel or pan A, Figs. 1 to 5, is arranged a revolving frame or carrier, which is supported and runs upon suitable wheels or rollers F, so that it can easily be revolved by hand. This frame or carrier comprises a lower ring E, whereby it is supported on the rollers F, and two upper rings E², rigidly connected at intervals with each other and with the ring E by bent or curved ribs E'. In this frame or carrier the empty molds or boxes G are placed one after another. The elevator D for the salt is so arranged, in combination with the pan A and the frame or carrier E, that the salt discharged from the buckets D' of the elevator D if not caught in the molds G will fall back into the pan A. By revolving the mold-carrier E intermittently the said molds can be successively brought under the buckets D' of the elevator D or under the discharge-spout thereof, (if such be employed,) so as to receive the salt discharged therefrom. After each mold is filled it will remain on the said carrier during the filling of other molds, so that the liquid may drain from it into the pan. As each mold, after being filled, arrives at a certain point in the revolution of the said carrier it is to be removed from the latter by hand, and the block of salt formed in the said mold can then be immediately removed therefrom, since the liquid will have been sufficiently drained from it to insure its retaining its shape. As each mold is filled and the carrier is revolved to bring other molds into position to be filled any surplus salt can be scraped from the top of the mold and will fall into the pan.

The revolving scrapers C C' in the evaporating vessel or pan A are mounted on a shaft C², which extends downward through a stuffing-box A³ in the bottom A² of the pan, and on the said shaft, below the pan A, is fixed a worm-wheel C³, geared with a worm L on a driving-shaft L', which shaft is also arranged to drive the elevator D by means of bevel-gearing L² L³, clutches C⁴ and L⁴ being also provided for throwing either the scrapers C C' or the conveyer D into or out of gear, as desired. I find it advantageous to use two or more curved scrapers, one, C, extending about half the distance from the center to the circumference of the pan and the other, C', extending from the center to or nearly to the inner circumference thereof.

In order to produce fine crystals, the evaporation must be rapid and the crystals must be removed directly or very soon after they are formed, so as to prevent caking and the formation of a bad thermally-conducting coat of crystals over the heating-surfaces. These conditions are very perfectly fulfilled by the improvements above described.

In the modification shown in Fig. 5 the ring E is provided with a circular rack E³, so that it can be readily rotated from the exterior of the pan by means of a bevel-pinion H, mounted on a shaft H', which extends through and turns in a stuffing-box H² in the wall of the pan A and is provided at its outer end with a hand-wheel H³.

The arrangement shown in Fig. 6 is more particularly adapted for dealing with coarse or large crystals, such as are produced when the evaporation takes place at comparatively low temperatures, such as from 180° to 190° Fahrenheit. In this case the crystals are delivered by the elevator D into perforated molds or cages G, suspended from travelers J, provided with rollers J', and running along an overhead rail or track K. This track is sometimes so arranged that the filled molds or cages can be run down an inclined part thereof and their contents unloaded into trucks, and then they can be run up again into the loading position.

It will be seen that by the above-described improvements I obviate not only the liability to waste of salt and brine, but also the loss of heat, as all the liquid draining from the molds and the surplus salt scraped therefrom are returned directly to the evaporating vessel or pan. I therefore effect great economy in the working of the apparatus and in the consumption of fuel.

In Figs. 6 and 7 I have shown a modification in which the end of the scraper C' is provided with a supporting-roller C⁵, so as to prevent undue friction between the scraper and the bottom of the pan.

What I claim is—

1. The combination, with an evaporating-pan, of a carrier arranged over the liquid in said pan, molds supported by said carrier, an external well connected with said pan, scrapers in said pan for continuously removing the deposited crystals therefrom into said well, and means for elevating the crystals from said well and delivering them into said molds successively, substantially as, and for the purposes, hereinbefore described.

2. The combination, with a circular evaporating-pan, of an external well connected therewith, revolving scrapers in said pan for continuously removing the deposited crystals therefrom into said well, and an elevator for raising said crystals from said well and discharging them into molds supported above the level of the liquid in said pan, substantially as hereinbefore described.

3. The combination, with an evaporating-pan, of a carrier revoluble in a horizontal plane over the liquid in said pan and adapted to contain molds for the reception of the deposited crystals, an external well connected with said pan, scrapers for continuously removing the deposited crystals from said pan into said well, and elevating mechanism whereby the deposited crystals are raised from said well and delivered into the molds in said revoluble carrier, substantially as, and for the purposes, hereinbefore described.

4. The combination, with an evaporating-pan, of a circular mold-carrier revoluble in a horizontal plane, rollers for supporting said mold-carrier over the liquid in said pan, molds in said carrier, means for intermittently rotating said mold-carrier, and elevating mechanism whereby the deposited crystals from said pan are raised and delivered into the molds in said carrier, substantially as, and for the purposes, hereinbefore described.

In testimony whereof I have hereunto set my hand in presence of two subscribing witnesses.

WILLIAM SHEDLOCK.

Witnesses:
 JOHN T. KNOWLES,
 ALEXANDER WILLIAM ALLEN.